(12) United States Patent
Nammi et al.

(10) Patent No.: US 11,489,708 B2
(45) Date of Patent: *Nov. 1, 2022

(54) CONVEYING MODULATION AND CODING INFORMATION FOR AN UPLINK DATA TRANSMISSION

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/950,400

(22) Filed: Nov. 17, 2020

(65) Prior Publication Data

US 2021/0067395 A1 Mar. 4, 2021

Related U.S. Application Data

(63) Continuation of application No. 16/802,070, filed on Feb. 26, 2020, now Pat. No. 10,873,490, which is a (Continued)

(51) Int. Cl.
*H04L 27/26* (2006.01)
*H04B 7/06* (2006.01)
(Continued)

(52) U.S. Cl.
CPC ....... *H04L 27/2627* (2013.01); *H04B 7/0626* (2013.01); *H04L 5/0048* (2013.01); *H04W 88/08* (2013.01)

(58) Field of Classification Search
CPC . H04L 27/2627; H04L 5/0048; H04L 1/0009; H04L 1/0023; H04L 5/0058;
(Continued)

(56) References Cited

U.S. PATENT DOCUMENTS 8,238,958 B2 8/2012 Bourlas et al.
9,179,426 B2 11/2015 Chen et al.
(Continued)

FOREIGN PATENT DOCUMENTS

WO 2017/140344 A1 8/2017
WO 2017/171956 A1 10/2017

OTHER PUBLICATIONS

3rd Generation Partnership Project; Technical Specification Group Radio Access Network; Physical layer procedures for data, Mar. 2018, 3GPP TS 38.214 V15.1.0. (Year: 2018).*
(Continued)

*Primary Examiner* — Tejis Daya
(74) *Attorney, Agent, or Firm* — Amin, Turocy & Watson, LLP

(57) ABSTRACT

Various embodiments disclosed herein provide for an improved system for selecting and conveying modulation scheme information for an uplink transmission. A network device can determine the channel state information for an uplink transmission based on sounding reference signals received from a user equipment device, and then select a modulation scheme for the uplink transmission based on the channel state information and associated signal to noise ratio. The network device can then send an indication of the selection to the user equipment device using an index number comprising six bits that correspond to an index number in a table of modulation schemes. The table of modulation schemes can include modulation schemes that use transform precoding, as well as modulation schemes that do not use transform precoding.

20 Claims, 10 Drawing Sheets

Related U.S. Application Data continuation of application No. 15/978,833, filed on May 14, 2018, now Pat. No. 10,623,224.

(51) Int. Cl.
  *H04L 5/00* (2006.01)
  *H04W 88/08* (2009.01)

(58) Field of Classification Search
  CPC . H04L 1/0003; H04L 5/0057; H04L 25/0224; H04B 7/0626; H04W 88/08
  See application file for complete search history.

(56) References Cited

U.S. PATENT DOCUMENTS

| | | | |
|---|---|---|---|
| 9,350,575 B2 | 5/2016 | Yang et al. | |
| 2007/0104129 A1* | 5/2007 | Yang | H04L 1/188 370/329 |
| 2009/0109999 A1* | 4/2009 | Kuri | H04L 1/0028 370/465 |
| 2009/0262856 A1* | 10/2009 | Onggosanusi | H04B 7/0615 375/267 |
| 2010/0061473 A1 | 3/2010 | Choi et al. | |
| 2010/0103902 A1 | 4/2010 | Kim et al. | |
| 2011/0205989 A1 | 8/2011 | Uziel | |
| 2013/0324145 A1 | 12/2013 | Tabet et al. | |
| 2014/0169297 A1* | 6/2014 | Kim | H04L 27/361 370/329 |
| 2015/0312071 A1 | 10/2015 | Chen et al. | |
| 2015/0365181 A1 | 12/2015 | Nagata et al. | |
| 2016/0219600 A1* | 7/2016 | Li | H04B 17/309 |
| 2016/0270018 A1 | 9/2016 | He et al. | |
| 2017/0332270 A1* | 11/2017 | Gandhi | H04L 47/38 |
| 2017/0332412 A1 | 11/2017 | Wang et al. | |
| 2018/0167133 A1 | 6/2018 | Choquette | |
| 2018/0176940 A1 | 6/2018 | Xu et al. | |
| 2019/0312706 A1* | 10/2019 | Nammi | H04L 1/0013 |
| 2020/0259609 A1* | 8/2020 | Saito | H04L 27/261 |
| 2021/0320747 A1* | 10/2021 | Yoshioka | H04L 1/0021 |

OTHER PUBLICATIONS

Non-Final Office Action received for U.S. Appl. No. 15/978,833 dated Aug. 20, 2019, 112 pages.

3GPP "3rd Generation Partnership Project; Technical Specification Group Radio Access Network", TS 38.214 v15.1.0, NR, Mar. 2018, 77 pages.

3GPP, "3rd Generation Partnership Project Technical Specification Group Radio Access Network", TS 38.211 V15.1.0 N R, Mar. 2018, 90 pages.

Notice of Allowance received for U.S. Appl. No. 16/802,070 dated Sep. 16, 2020, 32 pages.

* cited by examiner

CONVEYING MODULATION AND CODING INFORMATION FOR AN UPLINK DATA TRANSMISSION

RELATED APPLICATIONS

The subject patent application is a continuation of, and claims priority to each of, U.S. patent application Ser. No. 16/802,070, filed Feb. 26, 2020, and entitled "CONVEYING MODULATION AND CODING INFORMATION FOR AN UPLINK DATA TRANSMISSION," which is a continuation of U.S. patent application Ser. No. 15/978,833 (U.S. Pat. No. 10,623,224), filed May 14, 2018, and entitled "CONVEYING MODULATION AND CODING INFORMATION FOR AN UPLINK DATA TRANSMISSION," the entireties of which applications are hereby incorporated by reference herein.

TECHNICAL FIELD

The present application relates generally to the field of mobile communication and, more specifically, to conveying modulation and coding information for a NR or 5G uplink data transmission in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
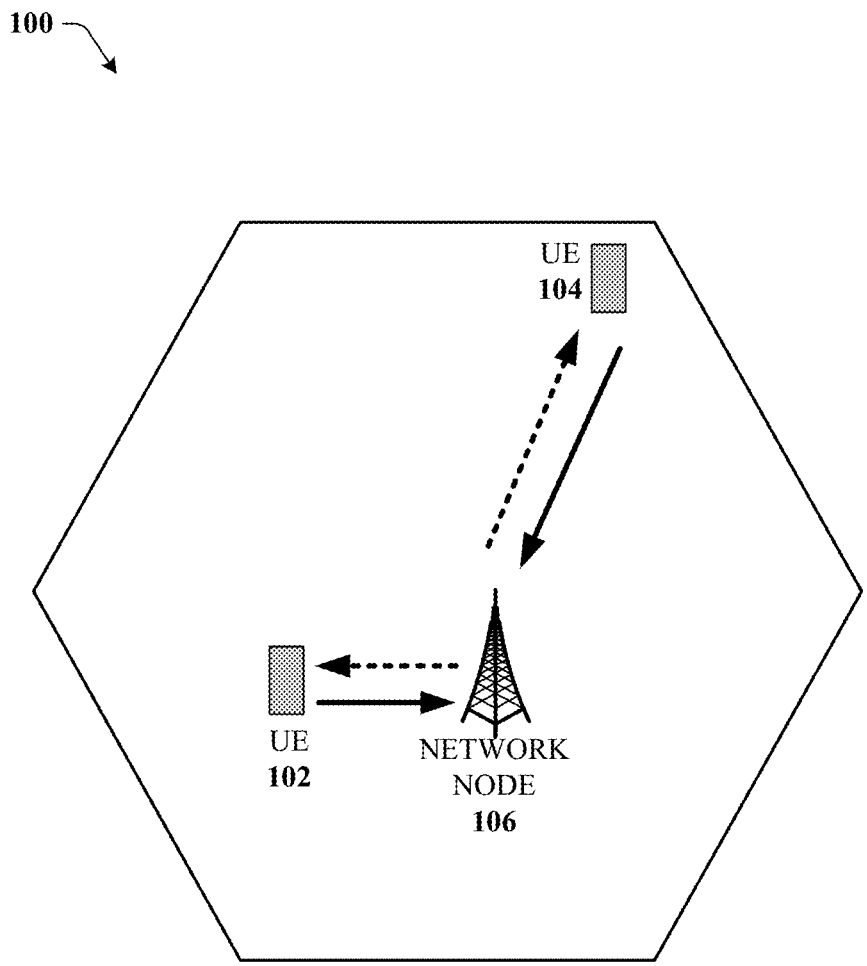
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for an improved system for selecting and conveying modulation scheme information for an uplink transmission. A network device can determine the channel state information for an uplink transmission based on sounding reference signals received from a user equipment (UE) device, and then select a modulation scheme for the uplink transmission based on the channel state information and associated signal to noise ratio. The network device can then send an indication of the selection to the user equipment device using an index number comprising six bits that correspond to an index number in a table of modulation schemes. The table of modulation schemes can include modulation schemes that use transform precoding, as well as modulation schemes that do not use transform precoding.

In traditional systems, the network can first indicate in radio resource control RRC signaling whether or not transform precoding will be used, and then later, in the downlink control channel, the network will indicate to the UE which modulation scheme will be used by including the index number of the selected modulation scheme. In the traditional system however, there are two tables, one that comprises modulation schemes associated with transform precoding, and one that comprises tables associated with no transform precoding. The problem with this approach however, is that RRC signaling does not occur as often as downlink control channel information is sent, and so the system is less able to adapt to changing channel state information. By sending an indication of the index number from a table the comprises both transform precoding and non-transform precoding modulation schemes with the downlink control channel information, the network can adapt to the changing signal to noise ratio and channel state information more rapidly.

While reference is generally made throughout the disclosure to uplink data transmissions, in other embodiments, the principles disclosed herein can apply to downlink transmissions as well.

In various embodiments, a base station device can comprise a processor and a memory that stores executable instructions that, when executed by the processor facilitate performance of operations. The operations can comprise determining channel state information for an uplink data transmission based on an uplink reference signal. The operations can also comprise selecting a modulation scheme for the uplink data transmission based on the channel state information. The operations can also comprise facilitating transmitting a selection of the modulation scheme on a downlink control channel transmission, wherein the selection of the modulation scheme comprises an index number from a data structure comprising a first group of transform precoding enabled modulation schemes and a second group of transform precoding disabled modulation schemes.

In another embodiment, method comprises determining, by a network device comprising a processor, a signal to noise ratio associated with an uplink data transmission based on an uplink reference signal. The method can also comprise selecting, by the network device, a modulation scheme for the uplink data transmission based on the signal to noise ratio. The method can also comprise transmitting, by the network device, an indication of the modulation scheme via a downlink control channel transmission, wherein the indication of the modulation scheme comprises an index number from a table comprising a first group of modulation schemes associated with transform precoding and a second group of modulation schemes not associated with the transform precoding.

In another embodiment machine-readable storage medium, comprising executable instructions that, when executed by a processor of a device, facilitate performance of operations. The operations can comprise receiving an uplink reference signal from a user equipment device. The operations can also comprise determining channel state information for an uplink data transmission from the user equipment device based on the uplink reference signal. The operations can also comprise selecting a modulation type for the uplink data transmission based on the channel state information, wherein the modulation type comprises a selection of transform precoding, modulation scheme, code rate, and spectral efficiency. The operations can also comprise transmitting an indication of a selection of the modulation scheme via a downlink control channel transmission, wherein the selection of the modulation scheme comprises the selection of an index number from a table comprising a group of modulation types.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 can receive reference signal from UE 104 or 102, and then based on the reference signals, determine channel state information for an uplink transmission from UE 102 or UE 104 to the network node 106. The network node 106 can then select a modulation scheme for the uplink transmission based on the channel state information and associated signal to noise ratio. The network device can then send an indication of the selection to the user equipment device using an index number comprising six bits that correspond to an index number in a table of modulation schemes. The table of modulation schemes can include modulation schemes that use transform precoding, as well as modulation schemes that do not use transform precoding.

In an embodiment, the uplink transmission can be a multi-antenna transmission of up to 4 antenna ports. The antenna or the layer mapping in general, can be described as a mapping from the output of the data modulation to the different antenna ports. The input to the antenna mapping thus consists of the modulation symbols (QPSK, 16QAM, 64QAM, 256QAM) corresponding to the transport block. The output of the antenna mapping is a set of symbols for each antenna port. The symbols of each antenna port are subsequently applied to the OFDM modulator—that is, mapped to the basic OFDM time-frequency grid corresponding to that antenna port.

In some embodiments, before the layer mapping is performed, and after the modulation mapping, the encoded symbols are passed through the transform precoder. For example, FFT (Fast Fourier Transform) can be used as a transform precoder. The main advantage of this scheme is the reduced peak average power ratio (PAPR) thereby improving the coverage of the systems.

The reference signals that the UE 104 and UE 102 send can be uplink reference signals that are predefined signals occupying specific resource elements within the uplink time-frequency grid. In an embodiment, the uplink reference signals can be UE specific reference signals. In an embodiment, there can be two types of uplink reference signals that are transmitted in different ways and used for different purposes by the network node 106. 1) Sounding reference signals (SRS): These reference signals are specifically intended to be used by network node 106 to acquire channel-state information (CSI) and beam specific information. In 5G systems, the SRS is UE specific so it can have a significantly lower time/frequency density. 2) Demodulation reference signals (DM-RS): These reference signals are specifically intended to be used by the gNB for channel estimation for data channel between the network node 106 and the UE 102 or 104. The label "UE-specific" relates to the fact that each demodulation reference signal is intended for channel estimation by the network node 106 from a specific UE (e.g., UE 102 or 104). That specific reference signal is then only transmitted within the resource blocks assigned for data traffic channel transmission to that terminal. Since in general the data is precoded, the DM-RDS can also be precoded with the same precoding as that of data.

Table 1 shows the supported modulation schemes for uplink data transmission if transform precoding is applied or not. Observe that the number of modulation schemes are 4 when transform precoding is not applied and is equal to 5 when transform precoding is applied.

TABLE 1

| Supported modulation schemes: | |
|---|---|
| Transform precoding disabled | Transform precoding enabled |
| | π/2-BPSK |
| QPSK | QPSK |
| 16QAM | 16QAM |
| 64QAM | 64QAM |
| 256QAM | 256QAM |

There can be various code rates with different spectral efficiencies for each of the sets of modulation schemes, with transform precoding disabled or enabled.

In traditional systems, the network node 106 would indicate to the UE 104 or 102 over RRC signaling whether transform precoding was enabled or not, and then select an index number from two separate tables or data structures indicating which modulation scheme to use.

A first modulation and coding (MCS) table when transform precoding is not enabled is shown in Table 2, and then a second MCS table when transform precoding is enabled is shown in Table 3.

TABLE 2

| MCS Index | Modulation order | Code rate | Spe. Eff. |
|---|---|---|---|
| 0 | 2 | 1/32 | 0.06 |
| 1 | 2 | 1/16 | 0.13 |
| 2 | 2 | 1/8 | 0.25 |
| 3 | 2 | 3/16 | 0.38 |
| 4 | 2 | 1/4 | 0.50 |
| 5 | 2 | 5/16 | 0.63 |
| 6 | 2 | 3/8 | 0.75 |
| 7 | 2 | 7/16 | 0.88 |
| 8 | 2 | 1/2 | 1.00 |
| 9 | 2 | 9/16 | 1.13 |
| 10 | 2 | 5/8 | 1.25 |
| 11 | 4 | 3/8 | 1.50 |
| 12 | 4 | 7/16 | 1.75 |
| 13 | 4 | 1/2 | 2.00 |
| 14 | 4 | 9/16 | 2.25 |
| 15 | 4 | 5/8 | 2.50 |
| 16 | 4 | 11/16 | 2.75 |
| 17 | 4 | 3/4 | 3.00 |
| 18 | 6 | 9/16 | 3.38 |
| 19 | 6 | 5/8 | 3.75 |
| 20 | 6 | 11/16 | 4.13 |
| 21 | 6 | 3/4 | 4.50 |
| 22 | 6 | 13/16 | 4.88 |
| 23 | 6 | 7/8 | 5.25 |
| 24 | 8 | 11/16 | 5.50 |
| 25 | 8 | 3/4 | 6.00 |
| 26 | 8 | 13/16 | 6.50 |
| 27 | 8 | 7/8 | 7.00 |
| 28 | 8 | 15/16 | 7.50 |
| Reserved | 2 | | |
| | 4 | | |
| | 6 | | |

TABLE 3

| MCS Index | Modulation order | Code rate | Spe. Eff. |
|---|---|---|---|
| 0 | 2 | 1/32 | 0.06 |
| 1 | 2 | 1/16 | 0.13 |
| 2 | 2 | 1/8 | 0.25 |
| 3 | 1 | 1/8 | 0.13 |
| 4 | 2 | 1/4 | 0.50 |
| 5 | 2 | 5/16 | 0.63 |
| 6 | 2 | 3/8 | 0.75 |
| 7 | 2 | 7/16 | 0.88 |
| 8 | 2 | 1/2 | 1.00 |
| 9 | 1 | 1/4 | 0.25 |
| 10 | 2 | 5/8 | 1.25 |
| 11 | 4 | 3/8 | 1.50 |
| 12 | 4 | 7/16 | 1.75 |
| 13 | 4 | 1/2 | 2.00 |
| 14 | 4 | 9/16 | 2.25 |
| 15 | 4 | 5/8 | 2.50 |
| 16 | 4 | 11/16 | 2.75 |
| 17 | 4 | 3/4 | 3.00 |
| 18 | 6 | 9/16 | 3.38 |
| 19 | 6 | 5/8 | 3.75 |
| 20 | 6 | 11/16 | 4.13 |
| 21 | 6 | 3/4 | 4.50 |
| 22 | 6 | 13/16 | 4.88 |
| 23 | 6 | 7/8 | 5.25 |
| 24 | 8 | 11/16 | 5.50 |
| 25 | 8 | 3/4 | 6.00 |
| 26 | 8 | 13/16 | 6.50 |
| 27 | 8 | 7/8 | 7.00 |
| 28 | 8 | 15/16 | 7.50 |
| Reserved | 2 | | |
| | 4 | | |
| | 6 | | |

In each of these embodiments, as there are 28 different modulation and coding schemes, 5 bits can be used to communicate the index selection, but the transform precoding indicator is sent during RRC signaling.

However, it can be observed that the scheme is not efficient as the resolution of the code rates for lower modulation scheme (modulation order is 1) is very low. This is because 5 bits are used for Table 2a for 4 modulation schemes and 5 bits are used in Table 2b for 5 modulation schemes. Hence the code rate resolution is different for these two tables and results in inefficient use of lower order modulation schemes such AS π/2-BPSK. This modulation schemes can be used for coverage improvement as the power amplifier can be driven with full power. This is because with π/2-BPSK, the out of band leakages can be minimized as π/2-BPSK avoids phase change of 180 degrees in successive bits there driving the power amplifier with full power.

In the current disclosure however, the two tables can be merged, with a first group of MCS entries that correspond to transform precoding, and a second group of MCS entries that are associated with transform precoding disabled modulation schemes. This can avoid having to wait for RRC signaling before changing whether transform precoding is enabled or not, and lets the network node 106 and UE 102 and 104 more dynamically adjust modulation schemes in response to changing SNR ratios and channel state information. Table 4 provides the MCS index table provided for in this disclosure.

TABLE 4

| MCS Index | Waveform selection | Modulation order | Code rate | Spe. Eff. |
|---|---|---|---|---|
| 0 | 1 | 1 | 1/32 | 0.06 |
| 1 | 1 | 1 | 1/16 | 0.13 |
| 2 | 1 | 1 | 1/8 | 0.25 |
| 3 | 1 | 1 | 1/8 | 0.13 |
| 4 | 1 | 2 | 1/4 | 0.50 |
| 5 | 1 | 2 | 5/16 | 0.63 |
| 6 | 1 | 2 | 3/8 | 0.75 |
| 7 | 1 | 2 | 7/16 | 0.88 |
| 8 | 1 | 2 | 1/2 | 1.00 |
| 9 | 1 | 2 | 1/4 | 0.25 |
| 10 | 1 | 2 | 5/8 | 1.25 |
| 11 | 1 | 4 | 3/8 | 1.50 |
| 12 | 1 | 4 | 7/16 | 1.75 |
| 13 | 1 | 4 | 1/2 | 2.00 |
| 14 | 1 | 4 | 9/16 | 2.25 |
| 15 | 1 | 4 | 5/8 | 2.50 |
| 16 | 1 | 4 | 11/16 | 2.75 |
| 17 | 1 | 4 | 3/4 | 3.00 |
| 18 | 1 | 6 | 9/16 | 3.38 |
| 19 | 1 | 6 | 5/8 | 3.75 |
| 20 | | 6 | 11/16 | 4.13 |
| 21 | 1 | 6 | 3/4 | 4.50 |
| 22 | 1 | 6 | 13/16 | 4.88 |
| 23 | 1 | 6 | 7/8 | 5.25 |
| 24 | 1 | 8 | 11/16 | 5.50 |
| 25 | 1 | 8 | 3/4 | 6.00 |
| 26 | 1 | 8 | 13/16 | 6.50 |
| 27 | 1 | 8 | 7/8 | 7.00 |
| 28 | 1 | 8 | 15/16 | 7.50 |
| 29 | 1 | | reserved | |
| 30 | 1 | | | |
| 31 | 1 | | | |
| 32 | 1 | 2 | 1/32 | 0.06 |
| 33 | 0 | 2 | 1/16 | 0.13 |
| 34 | 0 | 2 | 1/8 | 0.25 |
| 35 | 0 | 2 | 3/16 | 0.38 |
| 36 | 0 | 2 | 1/4 | 0.50 |
| 37 | 0 | 2 | 5/16 | 0.63 |
| 38 | 0 | 2 | 3/8 | 0.75 |
| 39 | 0 | 2 | 7/16 | 0.88 |
| 40 | 0 | 2 | 1/2 | 1.00 |
| 41 | 0 | 2 | 9/16 | 1.13 |
| 42 | 0 | 2 | 5/8 | 1.25 |
| 43 | 0 | 4 | 3/8 | 1.50 |
| 44 | 0 | 4 | 7/16 | 1.75 |
| 45 | 0 | 4 | 1/2 | 2.00 |
| 46 | 0 | 4 | 9/16 | 2.25 |
| 47 | 0 | 4 | 5/8 | 2.50 |
| 48 | 0 | 4 | 11/16 | 2.75 |
| 49 | 0 | 4 | 3/4 | 3.00 |
| 50 | 0 | 6 | 9/16 | 3.38 |
| 51 | 0 | 6 | 5/8 | 3.75 |
| 52 | 0 | 6 | 11/16 | 4.13 |
| 53 | 0 | 6 | 3/4 | 4.50 |
| 54 | 0 | 6 | 13/16 | 4.88 |
| 55 | 0 | 6 | 7/8 | 5.25 |
| 56 | 0 | 8 | 11/16 | 5.50 |
| 57 | 0 | 8 | 3/4 | 6.00 |
| 58 | 0 | 8 | 13/16 | 6.50 |
| 59 | 0 | 8 | 7/8 | 7.00 |
| 60 | 0 | 8 | 15/16 | 7.50 |
| 61 | 0 | | Reserved | |
| 62 | 0 | | | |
| 63 | 0 | | | |
| 64 | 0 | | | |

Using this technique, a total of 6 bits can be used to indicate the MCS index number and associated modulation and coding scheme selected by the network node 106. When the UE 102 or 104 receive the MCS index in the downlink control channel information, the can modulate and encode the uplink data transmission in accordance with the selected modulation and coding scheme.

As show in Table 4, with 6 bits of joint encoding of MCS and waveform selection (transform precoding enabled or disabled), we can add more entries for lower modulation schemes (π/2 BPSK) as well as higher order modulation schemes such as 256-QAM with enough granularity in code rate. Hence with the above approach, the coverage limited UE can use lower order modulations as well as high data demanding UE can use the same 6 bits for higher order modulations with high code rate. Hence with this approach we can improve the system capacity as well as the coverage of NR at same time.

Figure 2:
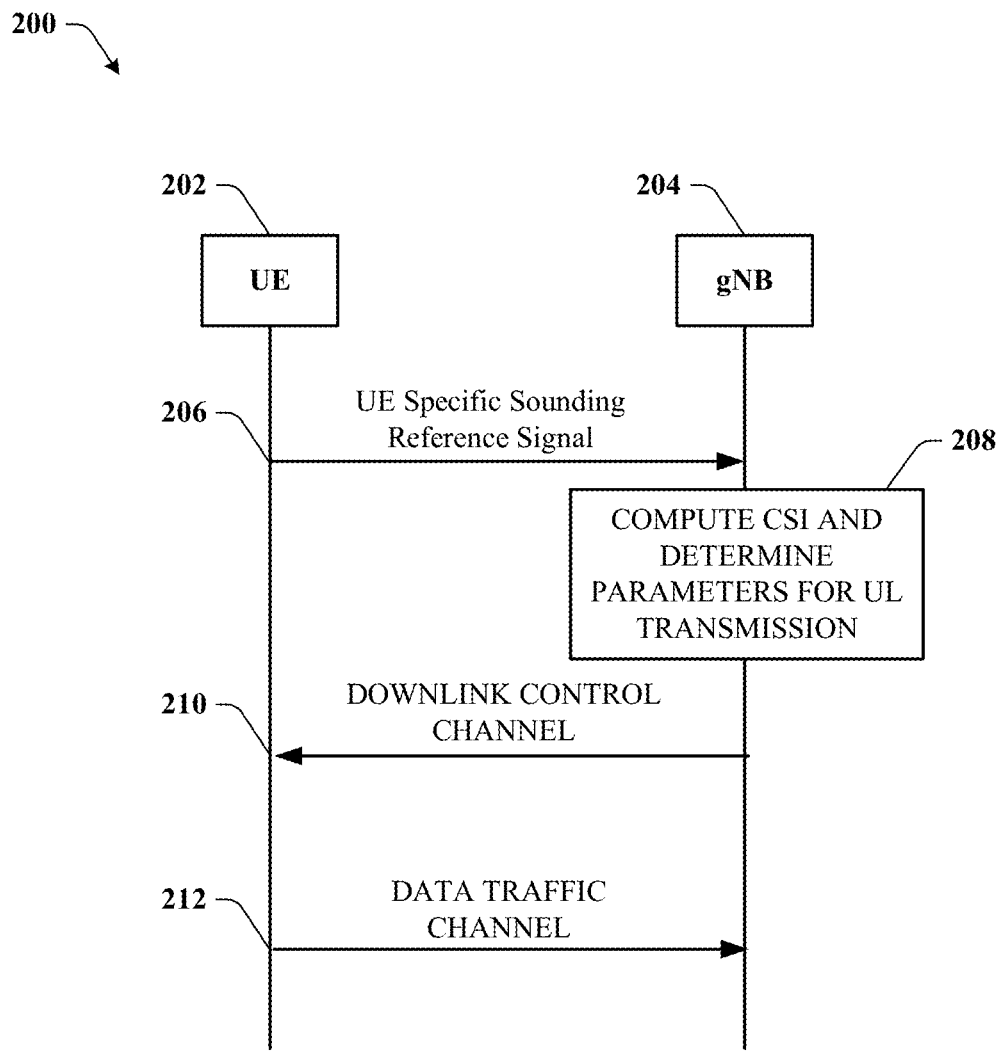
FIG. 2 illustrates an example block diagram showing a message sequence chart in accordance with various aspects and embodiments of the subject disclosure.

Turning now to FIG. 2, illustrated is an example block diagram showing a message sequence chart in accordance with various aspects and embodiments of the subject disclosure.

In an embodiment, a UE device 202 can send an UE specific sounding reference signal 206 to network node/gNB 204. In an embodiment, there sounding reference signal can be two types of uplink reference signals that are transmitted in different ways and used for different purposes by the gNB 204. 1) Sounding reference signals (SRS): These reference signals are specifically intended to be used by gNB 204 to acquire channel-state information (CSI) and beam specific information. In 5G systems, the SRS is UE specific so it can have a significantly lower time/frequency density. 2) Demodulation reference signals (DM-RS): These reference signals are specifically intended to be used by the gNB for channel estimation for data channel between the gNB 204 and the UE 202. The label "UE-specific" relates to the fact that each demodulation reference signal is intended for channel estimation by the network node 106 from a specific UE. That specific reference signal is then only transmitted within the resource blocks assigned for data traffic channel transmission to that terminal. Since in general the data is precoded, the DM-RDS can also be precoded with the same precoding as that of data.

At 208, the gNB 204 can compute the CSI and determine parameters for the uplink data transmission. The determination step consists for example computing channel quality indicator (CQI) and/or modulation and coding scheme (MCS), Transmit precoding matrix index (TPMI), and Transmit rank information (TRI), etc. In the determination step, the gNB 204 can select which modulation and coding scheme to use from Table 4, and then send an indication of the index number to the UE 202 via downlink control channel transmission 210. When the UE 202 sends the uplink data transmission, the UE 202 can use the selected modulation and coding scheme indicated by the gNB 204. If the channel state information changes, e.g., lower coverage due to the UE 202 being further away, more interference, etc., the gNB 204 can determine the channel state information for a new transmission from the UE reference signals, and select a new MCS index number and transmit the selection via the downlink control channel 210 without needing to wait for RRC signaling to indicate a change in the transform precoding status.

In an embodiment, if the SNR is below a certain level (e.g., a defined threshold), indicating low coverage, the gNB 204 can indicate that a transform precoding enabled modulation scheme is selected, but then if the SNR goes above the defined threshold, the gNB 204 can signal that a transform precoding disabled modulation scheme should be used, all without RRC signaling.

Figure 3:
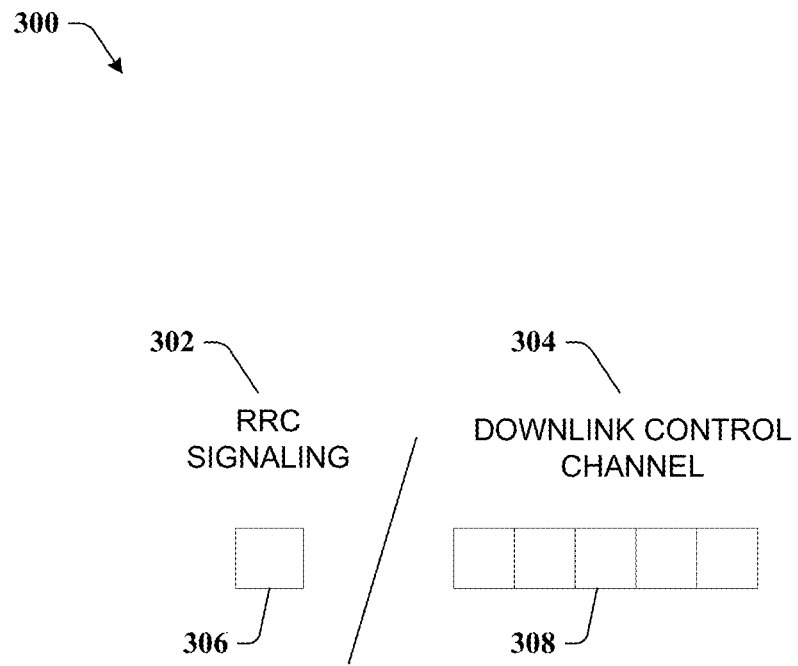
FIG. 3 illustrates an example block diagram showing a traditional modulation scheme indication system.
Figure 4:
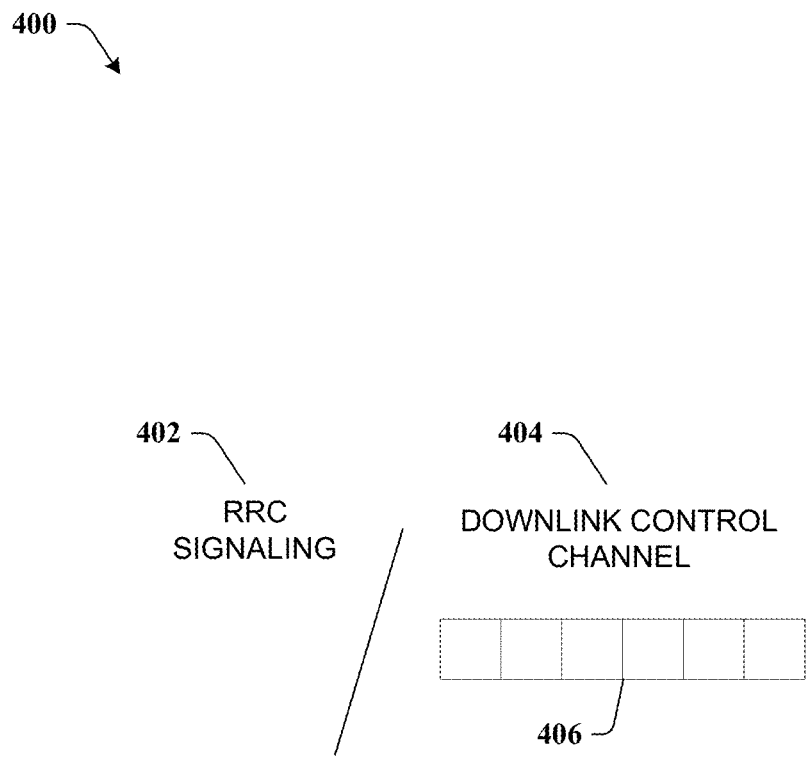
FIG. 4 illustrates an example block diagram showing an improved modulation scheme indication system in accordance with various aspects and embodiments of the subject disclosure.

Turning now to FIG. 3, illustrated is an example block diagram showing a traditional modulation scheme indication system 300. In this system, during RRC signaling 302, the network node can signal to the UE that a modulation scheme will be either transform precoding enabled or disabled via bit indicator 306. Then, during a downlink control channel 304, the network node can indicate via 5 bits 308 which modulation scheme is selected, (e.g., via a selection from Tables 2 or 3 depending on whether transform precoding is enabled). By contrast, in FIG. 4, which depicts an exemplary embodiment of the subject application, RRC signaling 402 does not indicate whether transform precoding is enabled or not, but instead the indication of the selection is sent via 6 bits 406 in downlink control channel information 404 (e.g., via a selection from Table 4).

Figure 5:
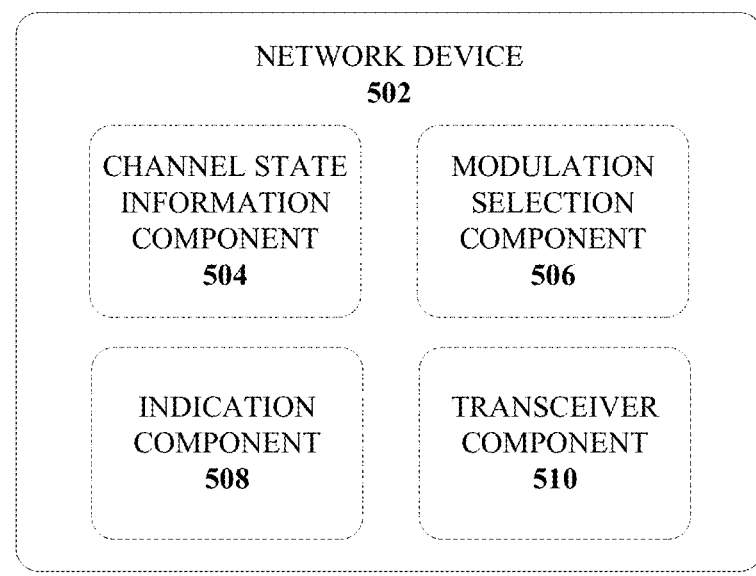
FIG. 5 illustrates an example block diagram of a network device configured to select and convey a selection of a modulation scheme in accordance with various aspects and embodiments of the subject disclosure.

Turning now to FIG. 5, illustrated is an example block diagram 500 of a network device 502 configured to select and convey a selection of a modulation scheme in accordance with various aspects and embodiments of the subject disclosure.

Network device 502 can include a channel state information component 504 that determine channel state information for an uplink data transmission based on an uplink reference signal received by a transceiver component 510 from a UE device. The reference signal can be either 1) Sounding reference signals (SRS): These reference signals are specifically intended to be used by the network device 502 to acquire channel-state information (CSI) and beam specific information. In 5G systems, the SRS is UE specific so it can have a significantly lower time/frequency density. 2) Demodulation reference signals (DM-RS): These reference signals are specifically intended to be used by the network device 502 for channel estimation for data channel between the network device 502 and the UE. The label "UE-specific" relates to the fact that each demodulation reference signal is intended for channel estimation by the network device 502 from a specific UE. That specific reference signal is then only transmitted within the resource blocks assigned for data traffic channel transmission to that terminal. Since in general the data is precoded, the DM-RDS can also be precoded with the same precoding as that of data.

The modulation selection component 506 can select a modulation scheme for the uplink data transmission based on the channel state information and from one of modulation and coding schemes in Table 4, and then indication component 508 can indicate via the 6 bits 406 in the downlink control channel information block the MCS index number associated with the modulation and coding scheme selected from Table 4. Transceiver component 510 can then facilitate transmitting a selection of the modulation scheme on a downlink control channel transmission, wherein the selection of the modulation scheme comprises an index number from a data structure comprising a first group of transform precoding enabled modulation schemes and a second group of transform precoding disabled modulation schemes.

Figure 6:
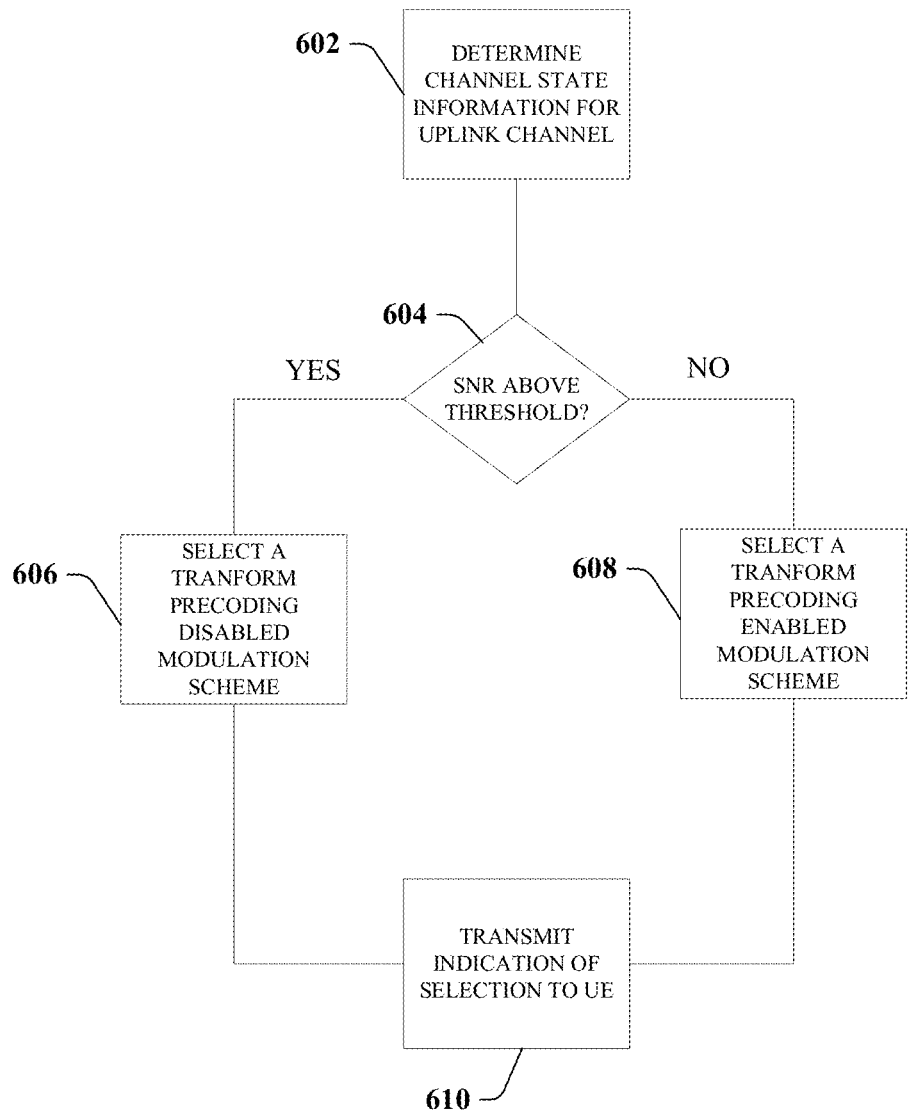
FIG. 6 illustrates an example flowchart showing a decision tree for selecting and conveying modulation scheme information in accordance with various aspects and embodiments of the subject disclosure.
Figure 7:
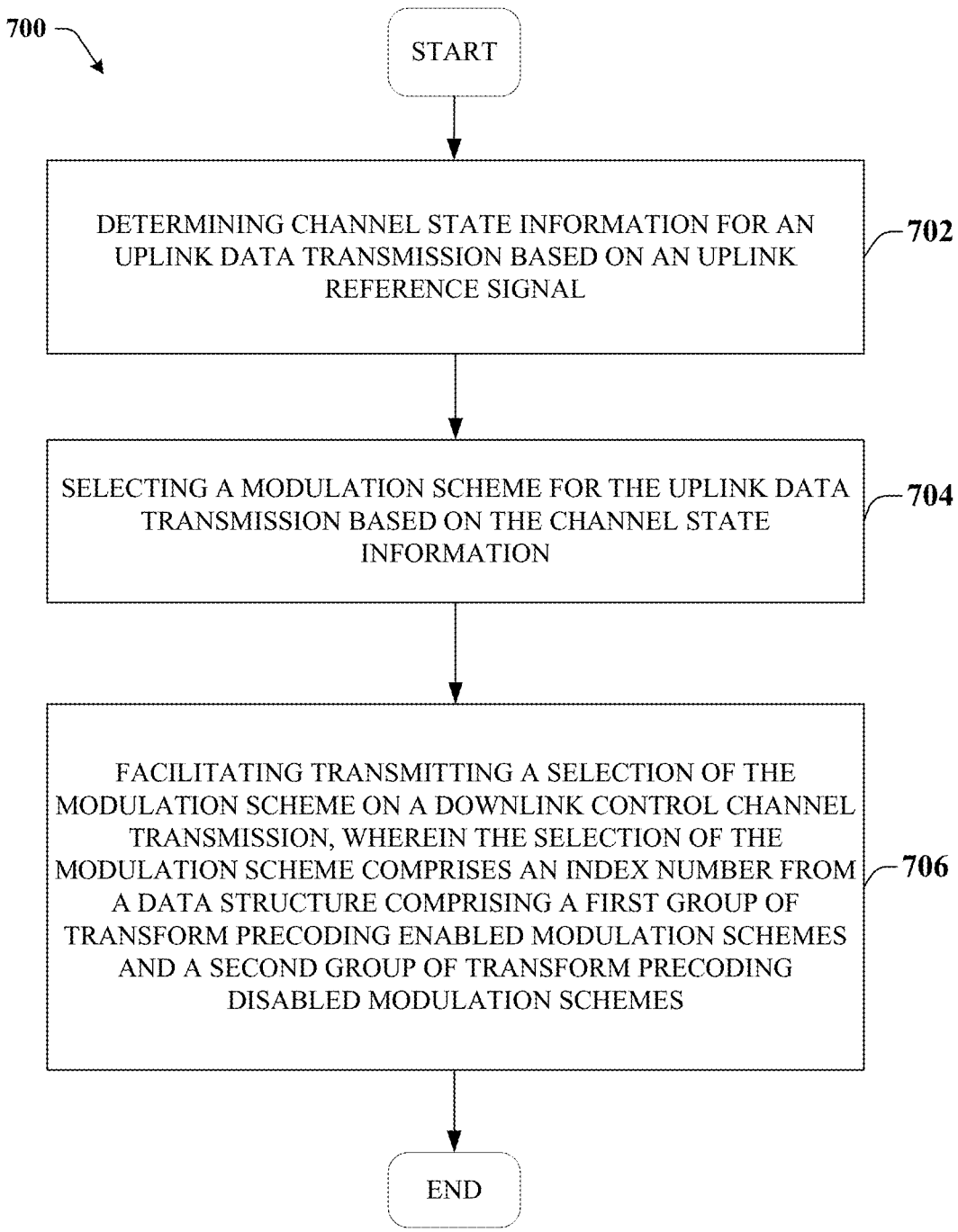
FIG. 7 illustrates an example method for selecting and conveying modulation scheme information in accordance with various aspects and embodiments of the subject disclosure.
Figure 8:
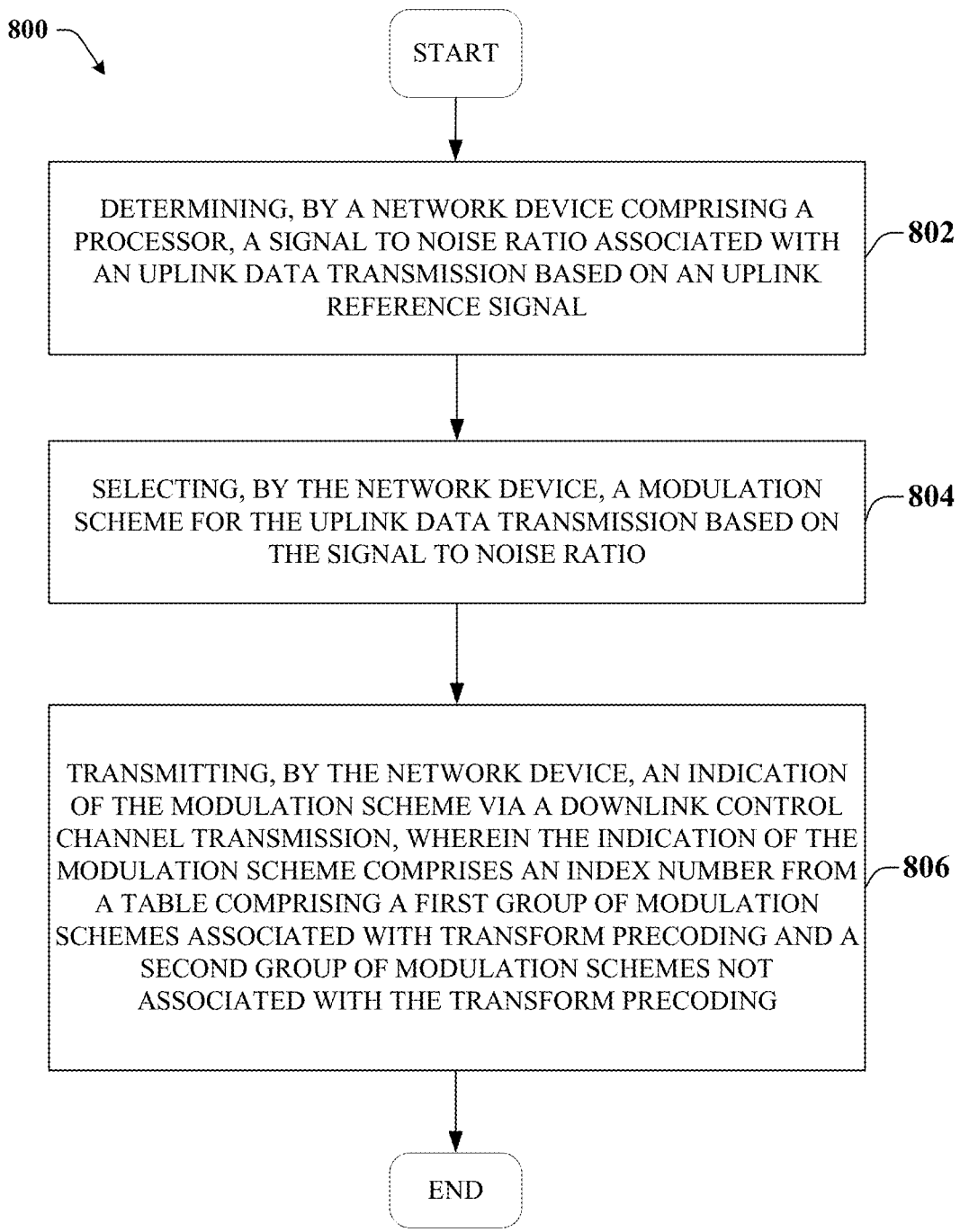
FIG. 8 illustrates an example method for selecting and conveying modulation scheme information in accordance with various aspects and embodiments of the subject disclosure.

FIGS. 6-8 illustrates a process in connection with the aforementioned systems. The processes in FIGS. 6-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example flowchart indicating decision tree for selecting and conveying modulation scheme information in accordance with various aspects and embodiments of the subject disclosure.

At 602 the system can receive reference signals from a UE, and then based on the reference signals determine channel state information for the uplink channel. If a SNR 604 associated with the channel state information is above a threshold, then at 606, the system can select a transform precoding disabled modulation scheme, whereas at 608, if the SNR is below the threshold, the system can select a transform precoding enabled modulation scheme. At 610, the system can transmit the indication (e.g., 6 bit index number of the selection from, e.g., MCS Table 4) to the UE device.

FIG. 7 illustrates an example method 700 for selecting and conveying modulation scheme information in accordance with various aspects and embodiments of the subject disclosure.

Method 700 can begin at 702 where the method includes determining channel state information for an uplink data transmission based on an uplink reference signal.

At 704, the method includes selecting a modulation scheme for the uplink data transmission based on the channel state information.

At 706, the method includes facilitating transmitting a selection of the modulation scheme on a downlink control channel transmission, wherein the selection of the modulation scheme comprises an index number from a data structure comprising a first group of transform precoding enabled modulation schemes and a second group of transform precoding disabled modulation schemes.

FIG. 8 illustrates an example method 800 for selecting and conveying modulation scheme information in accordance with various aspects and embodiments of the subject disclosure.

Method 800 can begin at 802 wherein the method includes determining, by a network device comprising a processor, a signal to noise ratio associated with an uplink data transmission based on an uplink reference signal.

At 804, the method can include selecting, by the network device, a modulation scheme for the uplink data transmission based on the signal to noise ratio.

At 806, the method can include transmitting, by the network device, an indication of the modulation scheme via a downlink control channel transmission, wherein the indication of the modulation scheme comprises an index number from a table comprising a first group of modulation schemes associated with transform precoding and a second group of modulation schemes not associated with the transform precoding.

Figure 9:
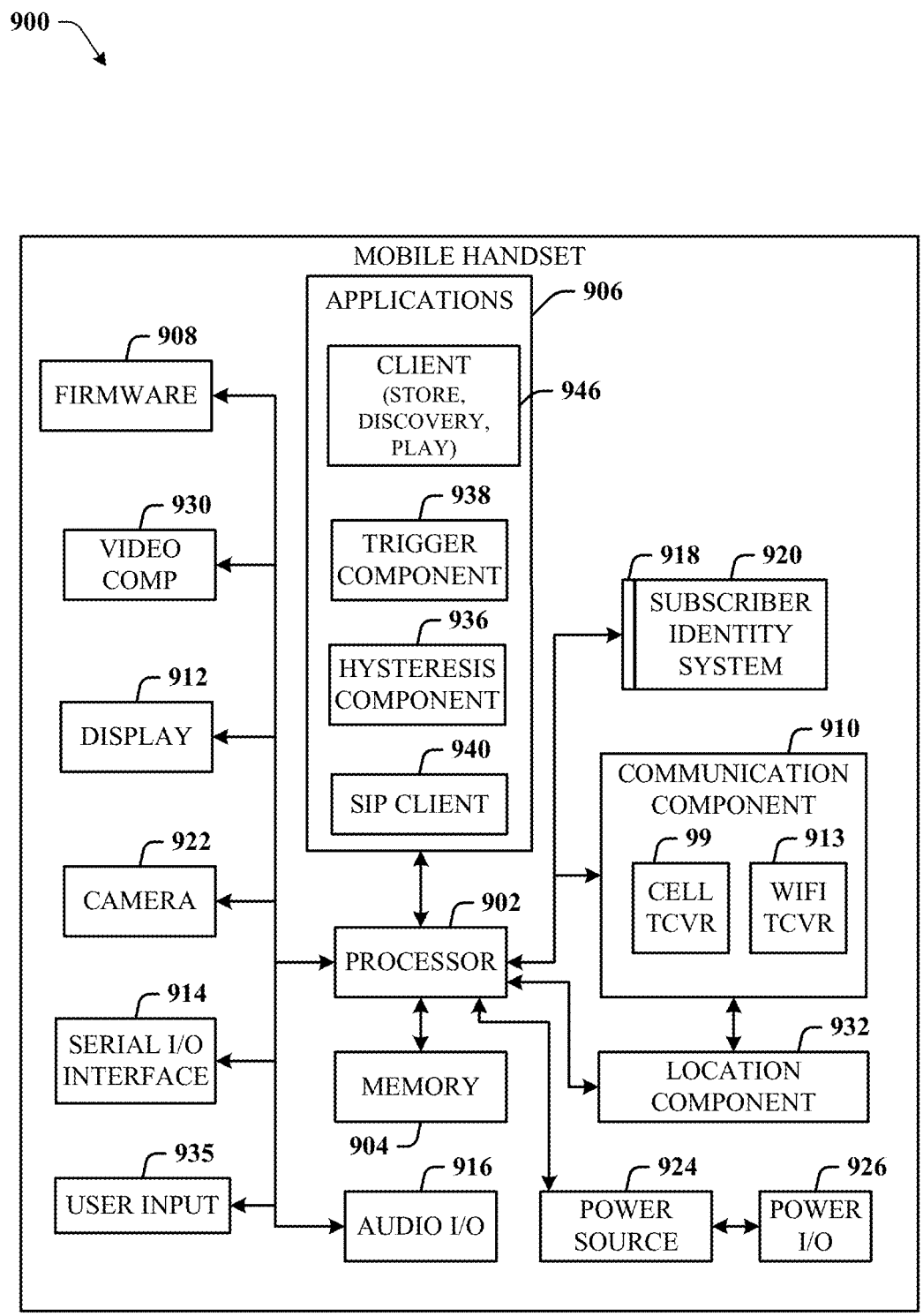
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
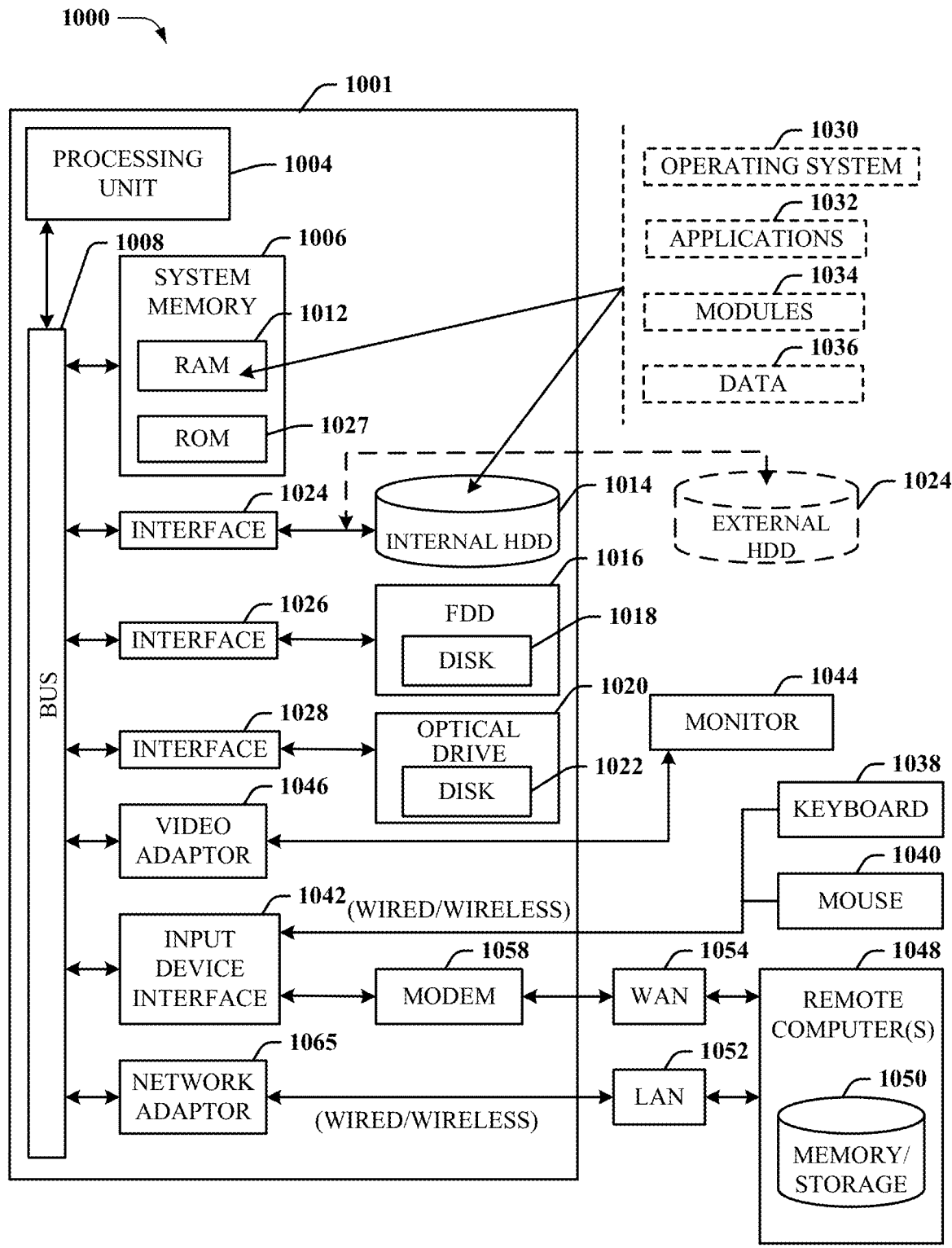
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, base station device 204, e.g.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Base station equipment, comprising:
    a processor; and
    a memory that stores executable instructions that, when executed by the processor, facilitate performance of operations, comprising:
        in response to a change in a signal to noise ratio indicated by channel state information for an uplink data transmission, selecting a second modulation scheme for the uplink data transmission;
        transmitting a selection of the second modulation scheme via a second downlink control channel transmission and not via radio resource control signaling, wherein the second modulation scheme is different from a first modulation scheme that is used to transmit via a first downlink control channel transmission; and
        in response to a determination that the change in the signal to noise ratio has resulted in the signal to noise ratio being below a defined threshold, indicative of threshold low coverage, transmitting an indication that a transform precoding enabled modulation scheme is to be selected.

2. The base station equipment of claim 1, wherein the channel state information is based on user-equipment-specific reference signals.

3. The base station equipment of claim 2, wherein the user-equipment-specific reference signals comprise sounding reference signals.

4. The base station equipment of claim 2, wherein the user-equipment-specific reference signals comprise demodulation reference signals.

5. The base station equipment of claim 1, wherein the channel state information comprises a computing channel quality indicator.

6. The base station equipment of claim 1, wherein the first modulation scheme is the transform precoding enabled modulation scheme, and the second modulation scheme is a transform precoding disabled modulation scheme.

7. The base station equipment of claim 1, wherein the first modulation scheme is a transform precoding disabled modulation scheme, and the second modulation scheme is the transform precoding enabled modulation scheme.

8. The base station equipment of claim 1, wherein the selection is indicated via at most six bits.

9. The base station equipment of claim 1, wherein each modulation scheme of modulation schemes comprising the first modulation scheme and the second modulation scheme comprises a different respective spectral efficiency.

10. A method, comprising:
  in response to a change in a signal to noise ratio associated with an uplink transmission, selecting, by network equipment comprising a processor, a second modulation scheme for the uplink transmission that replaces a first modulation scheme for the uplink transmission;
  facilitating, by the network equipment, transmitting an indication of the second modulation scheme via a downlink control channel transmission; and
  in response to a determination, as a result of the change, that the signal to noise ratio is above a defined threshold, signaling, by the network equipment, that a transform precoding disabled modulation scheme is recommended to be used.

11. The method of claim 10, wherein the uplink transmission comprises a multi-antenna transmission.

12. The method of claim 11, wherein the multi-antenna transmission comprises at most four antenna ports.

13. The method of claim 10, wherein the indication comprises an index number from a data structure.

14. The method of claim 13, wherein the index number is associated with a waveform selection indicator, a modulation order number, a code rate, and a spectral efficiency number.

15. A non-transitory machine-readable medium, comprising executable instructions that, when executed by a processor, facilitate performance of operations, comprising:
  in response to a change in a signal to noise ratio indicated by channel state information for an uplink data transmission, selecting a second modulation scheme for the uplink data transmission; and
  transmitting a first indication of the selecting of the second modulation scheme via a second downlink control channel transmission and not via radio resource control signaling, wherein the second modulation scheme is different from a first modulation scheme transmitting via a first downlink control channel transmission; and
  after the change,
    in response to determining that the signal to noise ratio has decreased below a defined threshold, indicative of threshold low coverage, transmitting a second indication that a transform precoding enabled modulation scheme is to be selected, or
    in response to determining that the signal to noise ratio has increased above the defined threshold, indicating that a transform precoding disabled modulation scheme is to be selected.

16. The non-transitory machine-readable medium of claim 15, wherein the operations further comprise merging a first group of modulation coding entries that correspond to transform precoding with a second group of modulation coding entries that are associated with transform precoding disabled modulation schemes.

17. The non-transitory machine-readable medium of claim 15, wherein the channel state information is based on user-equipment-specific reference signals.

18. The non-transitory machine-readable medium of claim 17, wherein the user-equipment-specific reference signals comprise sounding reference signals.

19. The non-transitory machine-readable medium of claim 17, wherein the user-equipment-specific reference signals comprise demodulation reference signals.

20. The non-transitory machine-readable medium of claim 15, wherein the channel state information comprises a computing channel quality indicator.

* * * * *